United States Patent
Angel et al.

(10) Patent No.: US 11,546,151 B2
(45) Date of Patent: Jan. 3, 2023

(54) SYSTEM FOR SECURING DEPLOYED SECURITY CAMERAS

(71) Applicant: Nagravision S.A., Cheseaux-sur-Lausanne (CH)

(72) Inventors: Michel Angel, Paris (FR); Philippe Le Berre, Geneva (CH); Herve Retaureau, Les Mureaux (FR); Minh-Son Tran, Bourg la Reine (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 186 days.

(21) Appl. No.: 16/956,180

(22) PCT Filed: Dec. 20, 2018

(86) PCT No.: PCT/EP2018/086402
§ 371 (c)(1),
(2) Date: Jun. 19, 2020

(87) PCT Pub. No.: WO2019/122242
PCT Pub. Date: Jun. 27, 2019

(65) Prior Publication Data
US 2020/0344053 A1    Oct. 29, 2020

Related U.S. Application Data

(60) Provisional application No. 62/608,556, filed on Dec. 20, 2017.

(30) Foreign Application Priority Data

Jan. 9, 2018  (EP) .................................... 18305014

(51) Int. Cl.
*H04L 9/40*    (2022.01)
*H04L 9/08*    (2006.01)
*H04L 9/16*    (2006.01)

(52) U.S. Cl.
CPC ............ *H04L 9/0891* (2013.01); *H04L 9/083* (2013.01); *H04L 9/0866* (2013.01); *H04L 9/16* (2013.01);
(Continued)

(58) Field of Classification Search
CPC ............ H04L 63/0435; H04L 63/0457; H04L 63/068; H04L 9/0891; H04L 9/083; H04L 9/16
See application file for complete search history.

(56) References Cited

U.S. PATENT DOCUMENTS

2003/0093694 A1* 5/2003 Medvinsky .......... G06Q 20/367
                                                                380/279
2005/0002525 A1* 1/2005 Alkove .............. H04N 21/2381
                                                                380/37

(Continued)

FOREIGN PATENT DOCUMENTS

IN        202017023552        9/2020
WO      WO-2019122242 A1    6/2019

OTHER PUBLICATIONS

Baugher et al., "The Secure Real-Time Transport Protocol (SRTP), RFC 3711", pp. 1-56, Mar. 2004. (Year: 2004).*

(Continued)

*Primary Examiner* — William S Powers
(74) *Attorney, Agent, or Firm* — Schwegman Lundberg & Woessner, P.A.

(57) ABSTRACT

Example embodiments provide systems and methods for securing a deployed camera. A security apparatus is coupled to the deployed camera and accesses video content from the coupled camera. The security apparatus accesses video content from the coupled camera, splits the video content within a plurality of RTP packets, encrypts payloads of the RTP packets, embeds in a header of the encrypted RTP packets, at least two key identifications for decryption of the (Continued)

encrypted RTP packets, and transmits the plurality of RTP packets over a network to a video management system.

19 Claims, 10 Drawing Sheets

(52) U.S. Cl.
CPC ...... *H04L 63/0435* (2013.01); *H04L 63/0457* (2013.01); *H04L 63/068* (2013.01)

(56) References Cited

U.S. PATENT DOCUMENTS

| | | | | |
|---|---|---|---|---|
| 2007/0033391 | A1* | 2/2007 | Hiramatsu | H04L 9/0838 713/153 |
| 2009/0141894 | A1* | 6/2009 | Sahdra | H04N 21/4126 380/239 |
| 2013/0223622 | A1 | 8/2013 | Sowa et al. | |
| 2017/0171611 | A1* | 6/2017 | Nair | H04N 21/4627 |

OTHER PUBLICATIONS

"European Application Serial No. 18305014.5, Extended European Search Report dated May 30, 2018", 10 pgs.

"International Application Serial No. PCT/EP2018/086402, International Search Report dated Jan. 23, 2019", 5 pgs.

"International Application Serial No. PCT/EP2018/086402, Written Opinion dated Jan. 23, 2019", 6 pgs.

"Video Encryption of Surveillance Camera", IP.COM Journal, ip.com Inc., West Henrietta, NY, US, (Jan. 30, 2008), 2-3.

Baugher, M, et al., "RFC 3711—The Secure Real-time Transport Protocol (SRTP)", (Mar. 31, 2004).

Kilroy, Hughes, et al., "Study of CD ISO/IEC 23000-19 Common Media Application Format for Segmented Media", 116. MPEG Meeting, (Aug. 17, 2016).

"European Application Serial No. 18822102.2, Communication Pursuant to Article 94(3) EPC dated May 28, 2021", 8 pages.

"Indian Application Serial No. 202017023552, First Examination Report dated Jul. 16, 2021", with English translation, 6 pages.

"European Application Serial No. 18822102.2, Response filed Aug. 10, 2021 to Communication Pursuant to Article 94(3) EPC dated May 28, 2021", 10 pages.

"International Application Serial No. PCT EP2018 086402, International Preliminary Report on Patentability dated Jul. 2, 2020", 8 pages.

"Indian Application Serial No. 202017023552, Response filed Jan. 11, 2022 to First Examination Report dated Jul. 16, 2021", 18 pgs.

"Indian Application Serial No. 202017023552, Hearing Notice dated Oct. 19, 2022", with English translation, 2 pgs.

\* cited by examiner

US 11,546,151 B2

SYSTEM FOR SECURING DEPLOYED SECURITY CAMERAS

PRIORITY

This patent application is a U.S. National Stage Filing under 35 U.S.C. § 371 from International Application No. PCT/EP2018/086402, filed on Dec. 20, 2018, which claims the benefit of priority to U.S. Provisional Patent Application Ser. No. 62/608,556, filed Dec. 20, 2017, and European Patent Application No. 18305014.5, filed Jan. 9, 2018, which are incorporated herein by reference in their entirety.

FIELD

The present disclosure generally relates to machines configured to the technical field of special-purpose machines that secure cameras already deployed in the field including computerized variants of such special-purpose machines and improvements to such variants, and to the technologies by which such special-purpose machines become improved compared to other special-purpose machines for securing cameras already deployed in the field (e.g., that may be vulnerable to cyberattacks and interception of video).

BACKGROUND

Deployed cameras (e.g., security or surveillance cameras) may be subject to cyberattacks and interception of video content. Typically, these deployed cameras are unmanaged and in some cases, are "dumb" devices.

BRIEF DESCRIPTION OF DRAWINGS

Various ones of the appended drawings merely illustrate example embodiments of the present invention and cannot be considered as limiting its scope.

DETAILED DESCRIPTION

Figure 1:
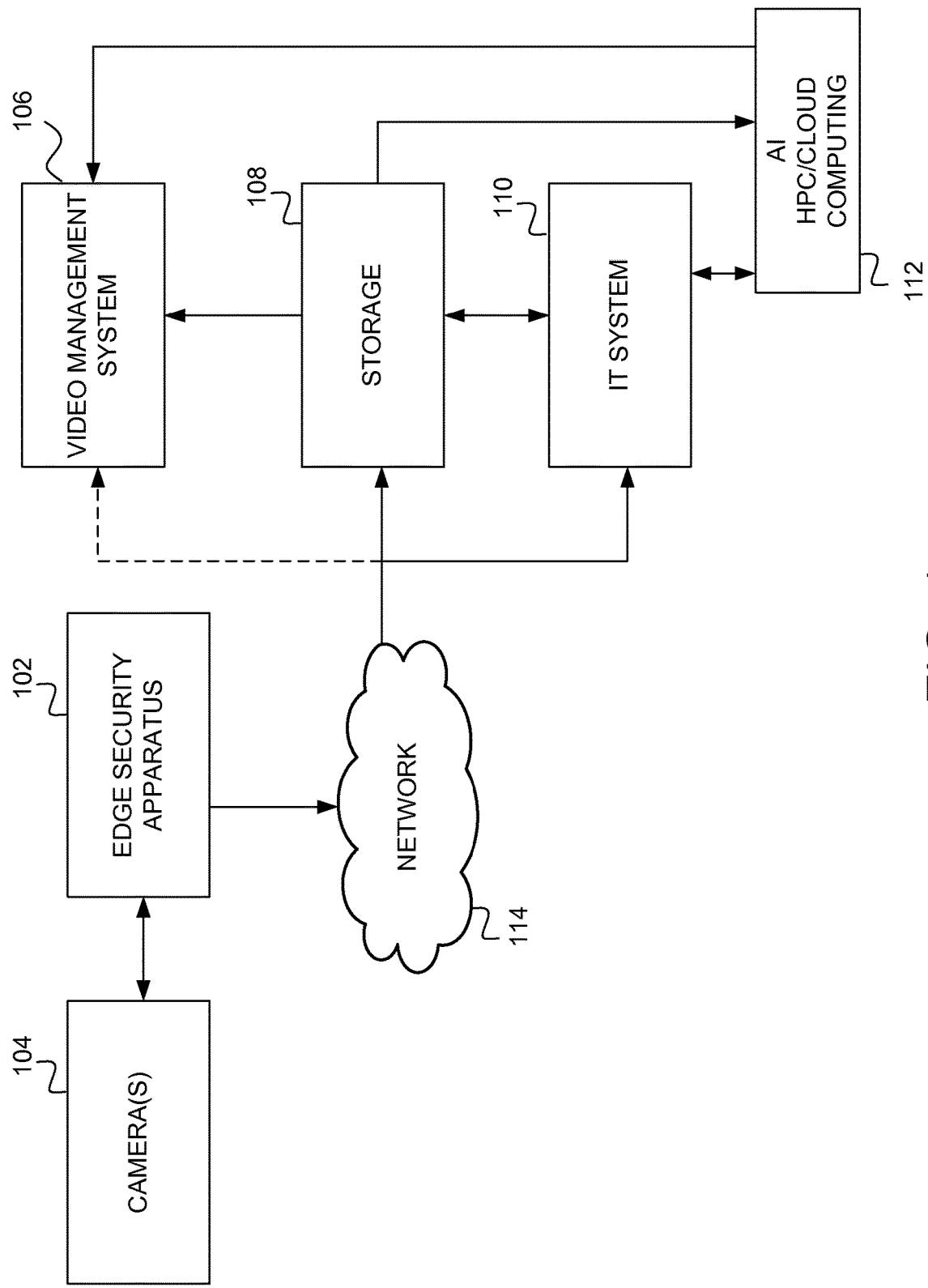
FIG. 1 is a diagram illustrating an environment in which example embodiments may be deployed in accordance with example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide the ability to secure or re-secure cameras already deployed in the field. Cameras that are already deployed may be subjected to, for example, hacking and use for launching an attack. For surveillance cameras that are recording images, the system needs to ensure that confidentiality or privacy is maintained. Furthermore, content that is stored to a cloud device may be breached if the content is not secured. A further security risk is that some cameras have back doors that enable individual to watch or access content without knowledge. These network and cyber security issues are addressed by example embodiments that provide a device or appliance (also referred to herein as "edge security apparatus" or "security apparatus") that couples to each camera and protects the video and the camera using strong encryption and firewall technologies. In some embodiments, the device "plugs in" or is attached behind the camera and provides added security without having to replace existing cameras.

As such, example methods (e.g., algorithms) facilitate securing (or re-securing) deployed cameras that may be subject to cyberattacks or interception of their video, and example systems (e.g., special-purpose machines or devices) are configured to provide security to deployed cameras that may be subject to cyberattacks or interception of their video. In particular, example embodiments provide mechanisms and logic that provide encryption and firewall functionalities to previously deployed cameras that may not have any security features or may not have any "intelligent" or smart features built-in. In example embodiments, the mechanisms and logic are embodied with an apparatus, device, or appliance (also referred to herein as an "edge security apparatus") that is coupled to the deployed camera(s) and provides smart Internet-of-Things (IoT) functionalities to cameras or the surveillance system in which the cameras operate. Because the apparatus can be added to the surveillance system after deployment (e.g., after-market apparatus), existing cameras or surveillance systems do not need to be replaced. As a result, one or more of the methodologies and systems described herein facilitate solving the technical problem of providing security to otherwise unsecured cameras to prevent cyberattacks or video interception.

With reference to FIG. 1, an embodiment of an example environment 100 that enables providing a system for securing deployed cameras is shown. In example embodiments, an edge security apparatus 102 (also referred to in the appendix as "solo and/or multi") is coupled (e.g., using bump-in-the-wire deployment) behind one or more deployed cameras 104. The edge security apparatus 102 provides various functions, components, and operations that help secure the cameras 104 and the video. The functions, components, and operations include one or more of, for example, a Power over Ethernet (PoE) switch, a network firewall, an Open Network Video Interface web application firewall (ONVIF WAF), secure content streaming (SRTP), content protection (e.g., enterprise-to-enterprise), watermarking, edge artificial intelligence processing (e.g., multi-channel correlation, secure deep learning), allowing third party application deployment, and providing unified management (e.g., OTA, security policy management, and Narrowband IoT enabled out-of-band).

In example embodiments, the edge security apparatus 102 is coupled between the camera(s) 104 and a video management system 106, such as that located in an office or control center that monitors the video content from the cameras 104. The edge security apparatus 102 may also be coupled to a storage 108 for storing the video from the cameras 104 and/or an IT system 110. In some embodiments, the storage 108 may be in the cloud. Alternatively, the storage 108 is located with the video management system 106. An artificial intelligence high-performance computing/cloud computing component 112 may also be present in the environment.

The edge security apparatus 102 comprises components that provide an adaptive process to predict, prevent, detect, and respond to (or prevent) security breaches (e.g., dongle) including protecting systems outside of IT's direct control (e.g., disconnect between traditional IT security teams). In some embodiments, "digital twins," of the edge security apparatus manages digital identities (e.g., metadata of video surveillance). The components of the edge security apparatus 102 also closely monitor API access to systems (e.g., ONVIF is API) and provides security monitoring and management practices for edge devices.

It is noted that the environment shown in FIG. 1 is merely an example. For instance, any number of cameras 104, storage 108, IT systems 110, and video management systems 106 may be embodied within the environment. Additionally, some components of the environment may be combined. Moreover, the functions described herein for any single system or machine may be subdivided among multiple systems or machines.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

In example embodiments, the edge security apparatus 102 uses Common Media Application Format (CMAF) as a payload format to transport the video content from the camera 104 to the storage 108 or the video management system 106. In one embodiment, CMAF is applied to a real-time transport protocol (RTP) payload for transport. The edge security system 102 takes the video content from the camera 104 and, in some embodiments, encrypts the video content. The edge security apparatus 102 generates CMAF fragments from the video content, and splits the CMAF fragments inside one or more RTP packets. For embodiments in which the video content is encrypted, information needed to decrypt the video content (e.g., signaling information) is contained within the RTP packet (e.g., added to the CMAF fragments).

The RTP packets containing the CMAF fragments are transmitted over a network 114 to the storage 108 or the video management system 106. On the video management system side, a player retrieves the RTP packets and extracts the CMAF fragments. In embodiments where the video content is encrypted, the video management system 106 extracts the information needed to decrypt the video content. In some instances, the extracted information indicates, to the video management system 106, from where to obtain a decryption key (e.g., which server to request the key from). If access is authorized, the key is provided and used to decrypt the video content. The CMAF fragments are processed by the video management system 106, and the video content is made displayable.

Figure 2:
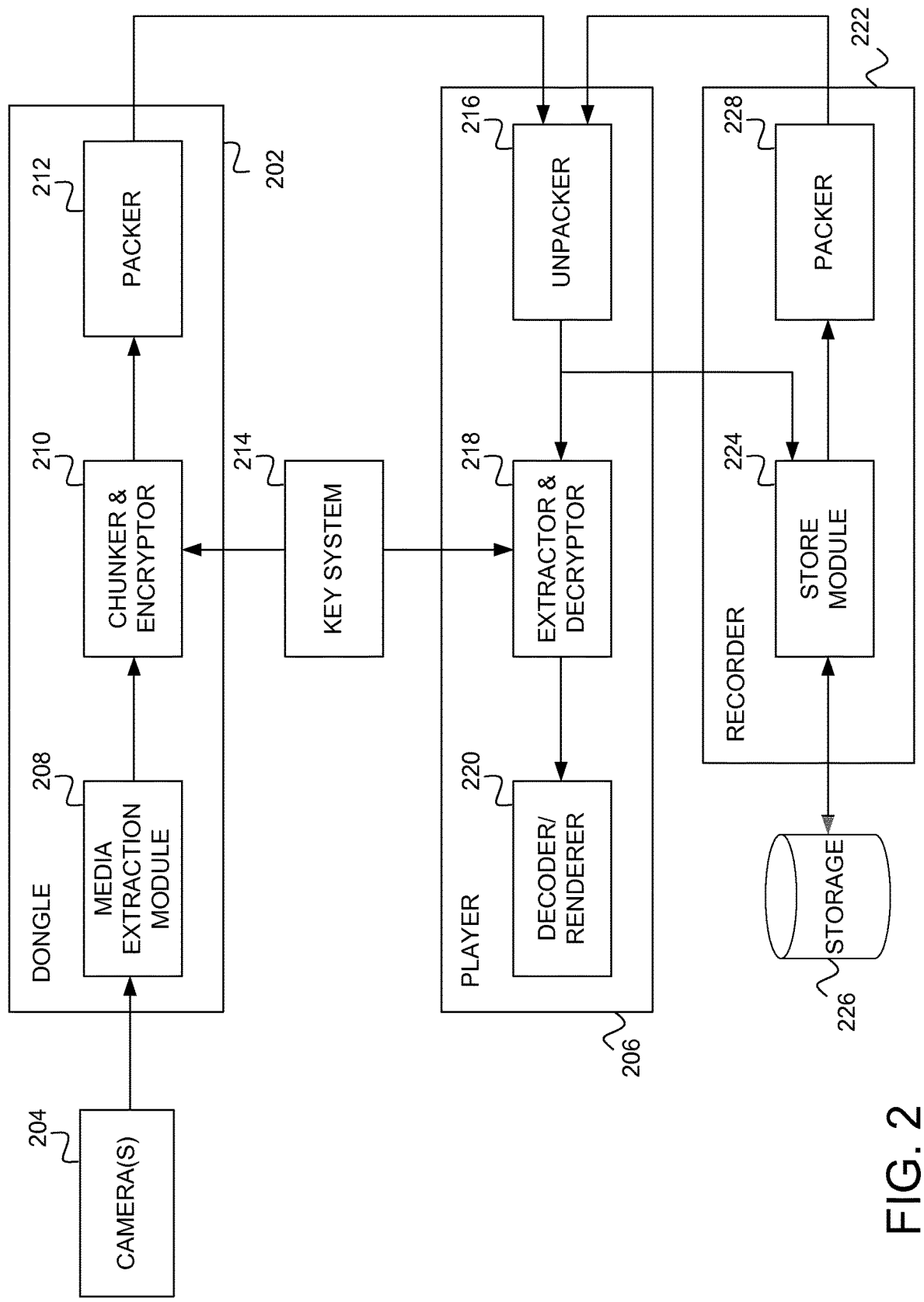
FIG. 2 is a more detailed embodiment of an example environment that enables providing a system for securing deployed cameras.

FIG. 2 is a more detailed embodiment of an example environment that enables providing a system for securing deployed cameras is shown. As shown, a camera 204 captures video content and provides the video content as a clear payload using RTP to a dongle 202. In example embodiments, the dongle 202 comprises the security apparatus that is coupled to the camera 204. The dongle 202 is configured to encrypt and pack the video content for transmission to a player 206 (e.g., the video management system). Accordingly, the dongle 202 comprises a media extraction module 208, a chunker and encryptor 210 (also referred to as an "chunker and encryption module"), and a packer 212. The media extraction module 208 extracts the content that will be used to create fragments. The extracted content is passed to the chunker and encryptor 210 as a clear network abstract layer (NAL). In example embodiments, the chunker and encryptor 210 uses CMAF and Common Encryption Scheme (CENC) to generate CMAF chunks (fragments of media content consisting of a plurality of CMAF), and encrypts the content. With respect to the encryption, the chunker and encryptor 210 communicates with a key system 214 (or key server) to obtain a key, as discussed further below. The key is then used to encrypt the content. In example embodiments, signaling information that identifies the key is included within CMAF fragments that are generated by the chunker and encryptor 210. The formatted and encrypted content is then passed to the packer 212 which packs the CMAF fragments into RTP packets. In example embodiments, a header of the RTP packet and RTP payload format is reworked (but still compatible with RTP). Session Description Protocol (SDP) related to Real-Time Streaming Protocol (RTSP)/RTP streaming is modified with a new field specifically for recording purposes. In example embodiments, RTSP is used to transmit the RTP packages over RTP to the player 206.

At the player 206, an unpacker 216 (also referred to as an "unpacker module") receives the transmitted content, for example, as a content stream (e.g., over a network or from storage) from the dongle 202. The unpacker 216 then "unpacks" or identifies the CMAF fragments in the RTP packets. The formatted, encrypted content identified by the unpacker 216 is provided to a media extractor and decryptor 218 (also referred to as an "extractor and decryption module"). In example embodiments, the media extractor and decryptor 218 extracts the signaling information, and uses the signaling information to obtain the key from the key system 214. Once the key is obtained, the media extractor and decryptor 218 decrypts the formatted and encrypted content and obtains clear NAL. The clear NAL is provided to a decoder/renderer 220 which generates, from the chunks or CMAF fragments, the video content for display.

In some embodiments, the content may be sent to a recorder 222 for storage. In these embodiments, the formatted, encrypted content is transmitted to a store module 224 in the recorder 222 after being identified by the unpacker 216. In some embodiments, the formatted, encrypted content comprise the CMAF fragments (e.g., CMAF is based on ISOBMFF). The store module 224 then stores the formatted, encrypted content as a file with encrypted content in storage 226. When the player 206 subsequently wants access to stored files, the store module 224 accesses the file from the storage 226 and passes the formatted, encrypted content from the file to a packer 228 in the recorder 222 (similar to the packer of the dongle 202). The packer 228 of the recorder 222 packs the formatted, encrypted content into RTP packets, and transmits the RTP packets to the player 206.

Figure 3:
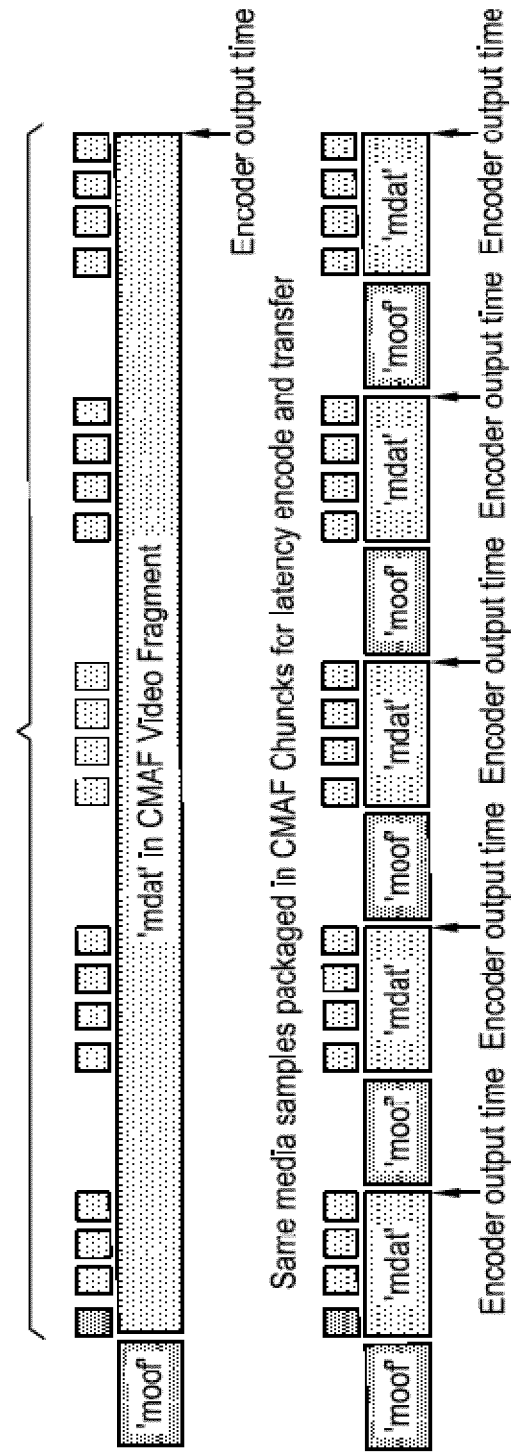
FIG. 3 illustrates an example CMAF fragment containing a coded video sequence of 20 samples.

FIG. 3 illustrates an example CMAF fragment containing a coded video sequence of 20 samples. A video encoder outputs network abstract layers (NALs), which may include video coding layer (VCL) NALs and non-VCL NALs. The VCL NALs make frames, and the frames are grouped in groups of pictures (GOP). While chunks can contain a full GOP, this increases latency because the camera needs to wait for a full GOP before being able to construct the chunk and transmit it. In order to improve latency, the GOP can be split into several chunks. Additionally, by using RTP/RTSP, streaming latency is low (e.g., sub-second Dynamic Adaptive Streaming over HTTP (DASH) with CMAF low latency chunks).

Figure 4:
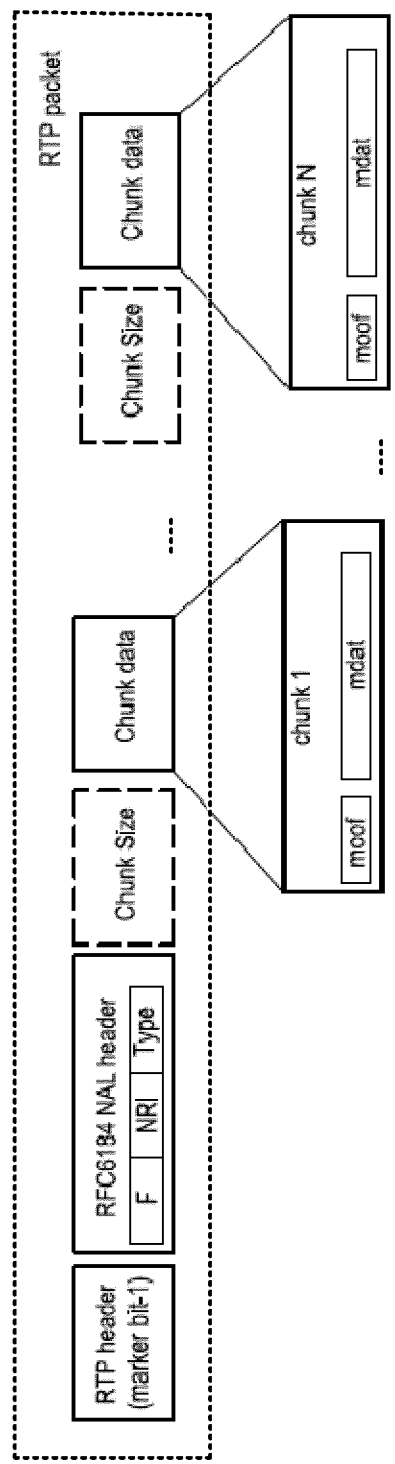
FIG. 4 illustrates RTP transport of CMAF chunks when the chunks are not split over several RTP packets in accordance with example embodiments.

In some embodiments, the chunks are not split over several RTP packets. This is possible when the chunks are small. FIG. 4 illustrates RTP transport of CMAF chunks when the chunks are not split over several RTP packets. Instead, several chunks are included in the RTP payload. Here, the type is SINGLE_CHUNK=1: One chunk; the Chunk size field is not present or optional. Furthermore, the type is a single time aggregation packet meaning that several chunks are included in the RTP payload.

Figure 5:
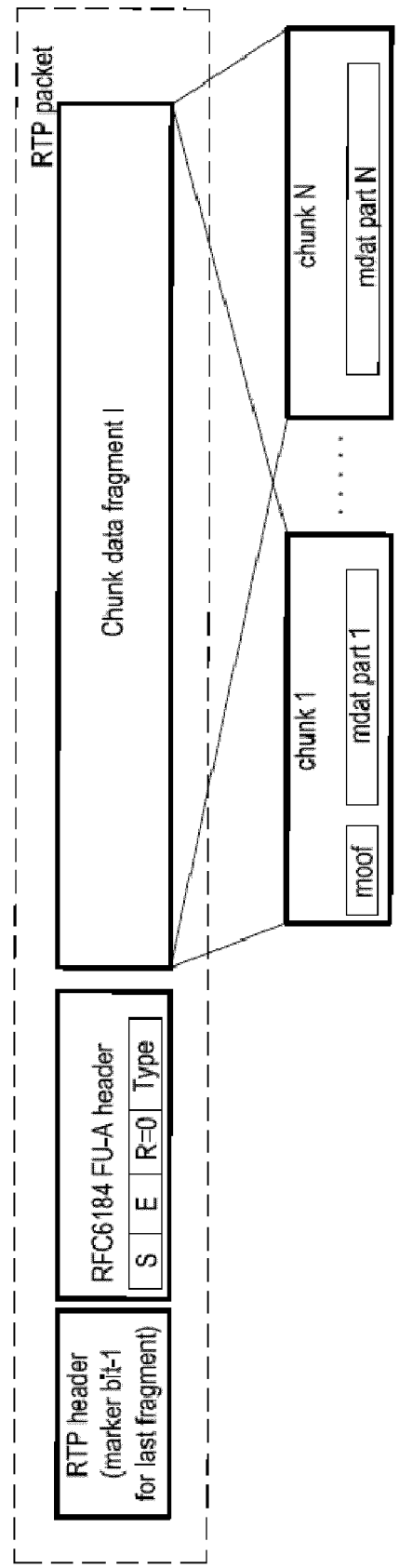
FIG. 5 illustrates the splitting of chunks over several RTP packets in accordance with example embodiments.

In embodiments with large chunks, especially when RTP packets are sent over, for example, user datagram protocol (UDP) and should take maximum transmission unit (MTU) size into account, it may be necessary to split the chunks over several RTP packets as illustrated in FIG. 5. In this case, S=1: start of fragmented chunk (else S=0)
E=1: end of fragmented chunk (else E=0)
Type=FU-A=28
Marker bit=1 for RTP packet containing last fragment of chunk.

In order to secure the RTP payload, the content is encrypted thus resulting in secure real-time protocol (SRTP) packets. In some embodiments, a key derivation function is used to derive different keys used in a crypto context (e.g., SRTP encryption keys and SRTP authentication keys) from one single master key in a cryptographically secure way. Thus, the key management protocol may exchange a single master key, and all session keys are generated by applying the key derivation function. In example embodiments, for SRTP protection, key rotation signaling is performed using an original master key index (MKI) for signaling two key identifiers (KID).

Figure 6:
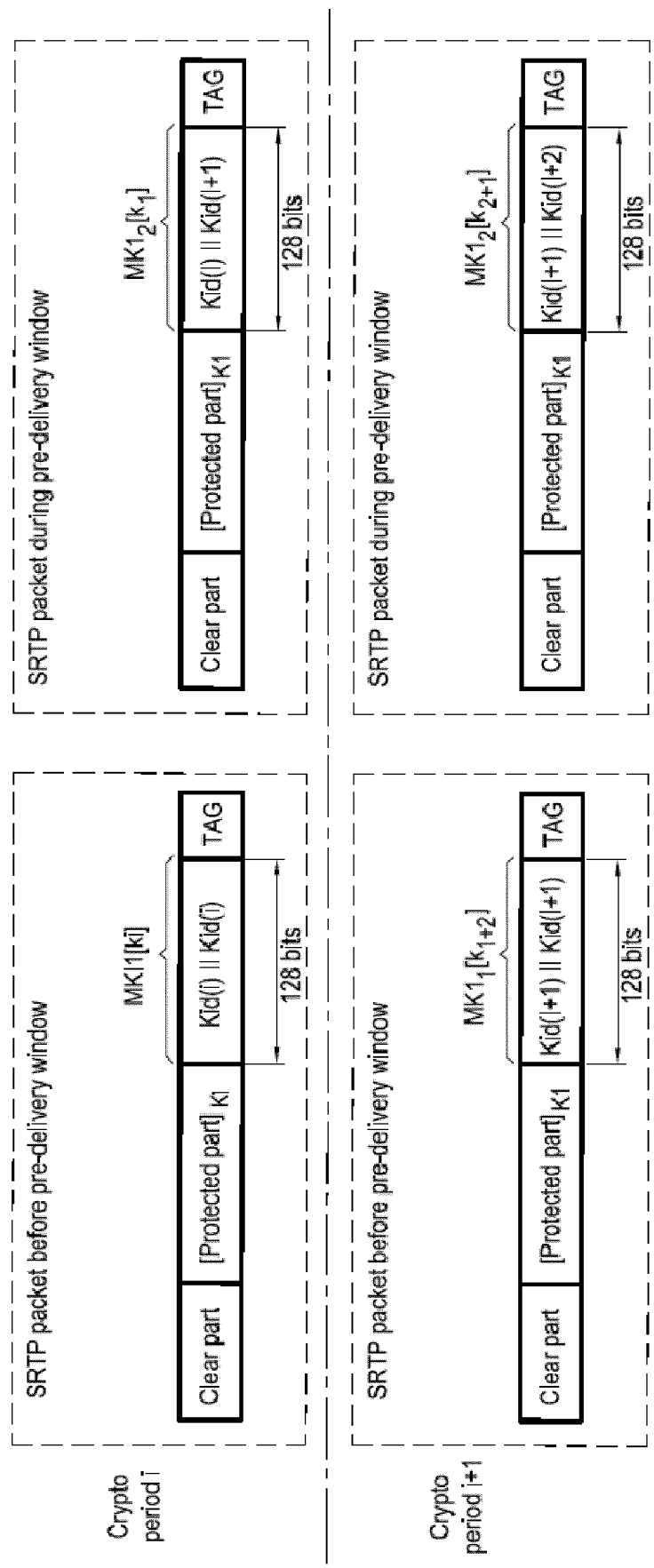
FIG. 6 illustrates MKI management in SRTP packets which allows a smooth master key rotation in accordance with example embodiments.

FIG. 6 illustrates the MKI management in SRTP packets which allows a smooth master key rotation. As shown in FIG. 6, crypto-period is a master key crypto period. In order to anticipate the key rotation, information is placed in the MKI, which allows retrieval of the next key before it is needed. Nevertheless, in order to keep compliance with SRTP specification, there is only one MKI per SRTP packet. Therefore, example embodiments perform a unique process. Accordingly, at the beginning of a crypto period, the MKI ($MKI_1$) is equal to the related Keyid (Kid(i)) of the master key repeated twice. Additionally, before the end of the crypto period (referred to herein as "pre-delivery window"), the MKI ($MKI_2$) is the concatenation of the current KeyId (Kid(i)) and the KeyId of the next crypto period (Kid(i+1)). In some embodiments, at a SRTP level, $MKI_1$ and $MKI_2$ identify the same master key.

On the client side (e.g., at the video management system side), when receiving a SRTP packet, the following processing occurs. First, the client (e.g., the video management system) obtains (e.g., extracts) the MKI from the SRTP packet. If (MKI_contains twice the same keyId) then, the client requests a master key with the KeyId if the master key is not yet available and adds (MKI/Key) in SRTP context. In the alternative, KeyId1=8MSB(MKI); KeyId2=8LSB (MKI), and a request for Key1 and Key2 is made if not already requested. Additionally, the (MKI/Key1) is added in the SRTP context. In either case, the client keeps at application level KeyId1/Key1 and KeyId2/Key2. The client then decrypts the SRTP packet with the master key identified by the MKI in the SRTP context. After key rotation, when the SRTP packet with the MKI (KeyId2∥KeyId2) arrives, the MKI2/Key2 is added in the SRTP context.

Figure 7:
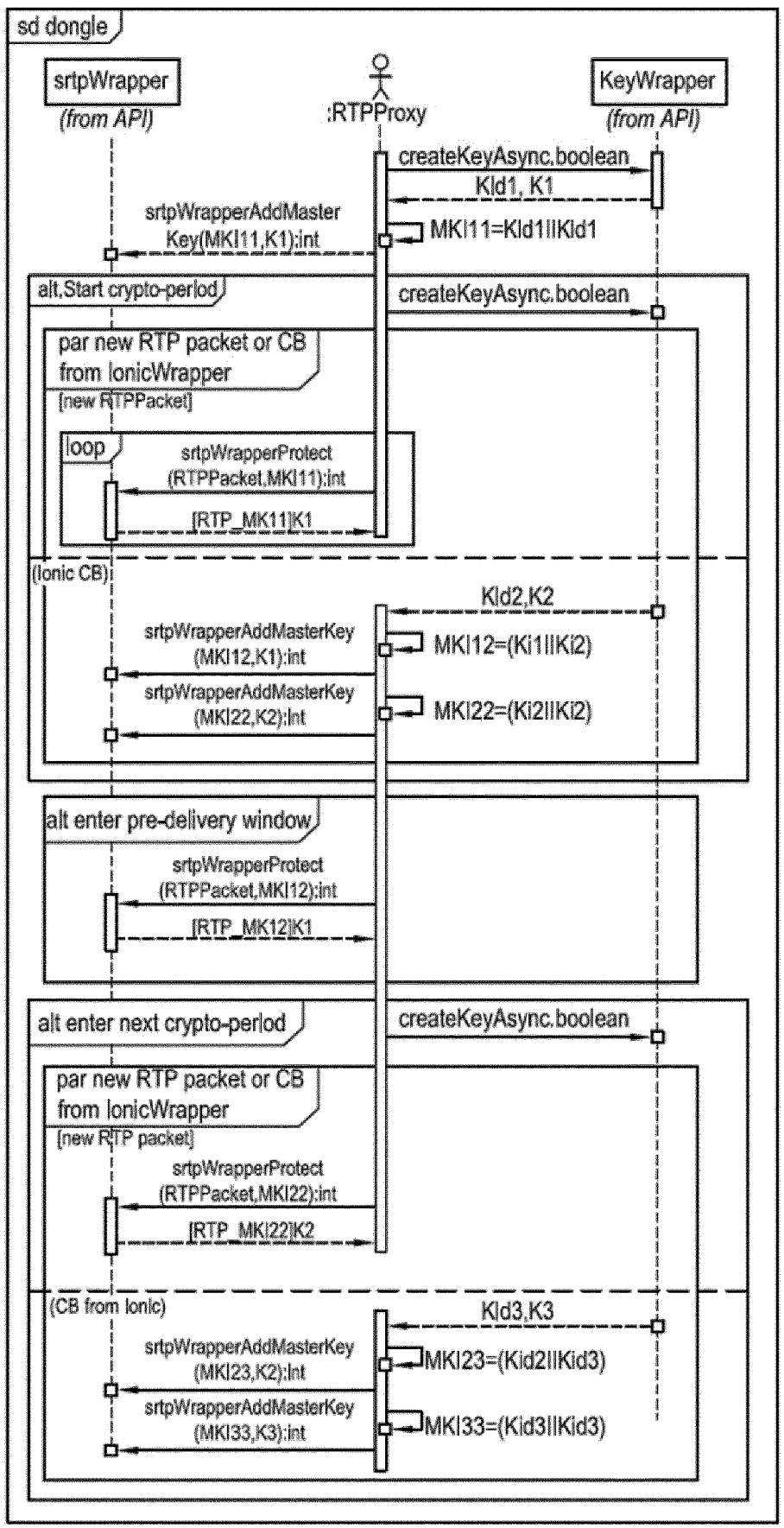
FIG. 7 illustrates a diagram showing how a proxy (e.g., the security apparatus) manages the key rotation in accordance with example embodiments.

FIG. 7 illustrates a diagram showing how a proxy (e.g., the security apparatus) manages the key rotation. It describes how key management is managed within the dongle (e.g. security apparatus) showing interactions between internal entities: srtpWrapper (e.g. SRTP protection management), RTPProxy (e.g. RTP/RSTP application) and the key wrapper (e.g. the keying system).

Assuming SRTP protection management (srtpWrapper) manages a circular buffer with three items (e.g., MKI, Key) the process is as follows:

Startup
    When a new RTP session is created, the proxy asks asynchronously for 1 key from the key server:
    When first key (K1, Kid1) arrives, the proxy sets a master key K1 to srtpWrapper with MKI11=(Kid1∥Kid1)

Start crypto-period
    The proxy asks for a next key (K2)
    RTP packets can be encrypted with (MKI11, K1)
    When next key (K2, Kid2) arrives:
        The proxy sets again a master key K1 to srtpWrapper with MKI12=(Kid1∥Kid2)
        The proxy sets master key K2 to srtpWrapper with MKI22=(Kid2∥Kid2)
    At this stage, srtpWrapper table contains (MKI11, K1), (MKI12, K1), and (MKI22, K2)

When entering into pre-delivery windows:
    RTP packets are encrypted with (MKI12, K1)

When entering into next crypto-period:
    The proxy asks asynchronously for a next key from the key server (K3)
    RTP packets are encrypted with (MKI22, K2)

When next key (K3, Kid3) arrives:
  The proxy sets again a master key K2 to srtpWrapper with MKI23=(Kid2∥Kid3)
    At this stage, srtpWrapper table contains (MKI23, K2), (MKI12, K1), and (MKI22, K2)
  The proxy sets master key K3 to srtpWrapper with MKI33=(Kid3∥Kid3)
    At this stage, srtpWrapper table contains (MKI23, K2), (MKI33, K3) and (MKI22, K2)

It will be well understood that this embodiment is not a limited example and key signaling as proposed in RTP can be used independently of CMAF in the payload of RTP. Thus MKI11=f(Kid1,Kid1)
MKI12=f(Kid1,Kid2)
MKI22=f(Kid1,Kid2)

Other forms of the function f(Kid) can be used, rather than a concatenation function of two input parameters in their order Kidn∥Kidn+1.

Figure 8:
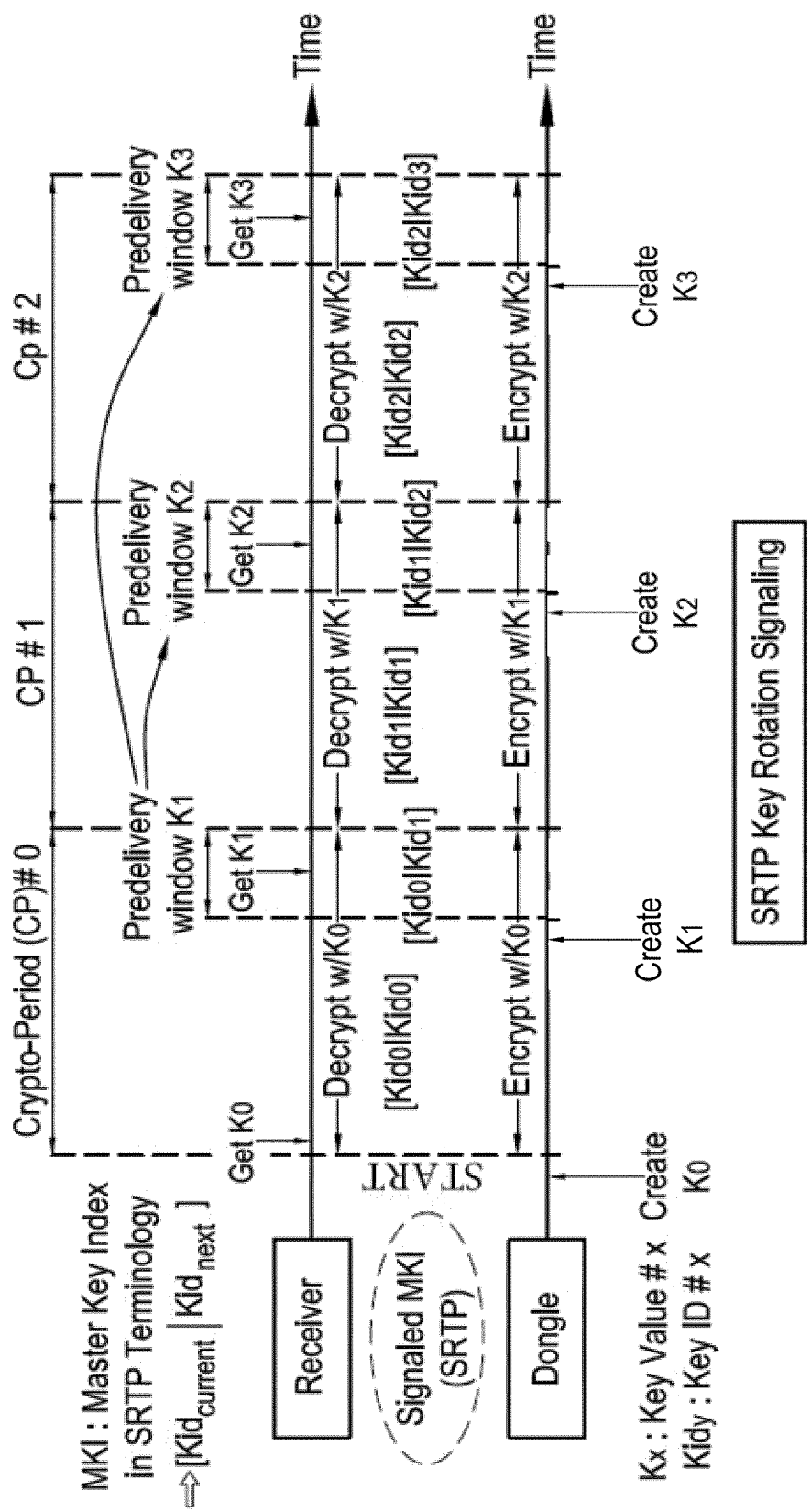
FIG. 8 illustrates SRTP key rotation signaling in accordance with example embodiments.

FIG. 8 illustrates the SRTP key rotation signaling in accordance with example embodiments. It 8 describes how key rotation is managed from streaming start by defining the SRTP MKI packet header field ([KIDx|KIDy]) for signaling key identifiers (KID) to be used in current and next defined crypto-period. This signaling is related to a key pre-delivery window that map a part or the whole crypto-period. It is set by the dongle (e.g. edge security apparatus) which perform SRTP encryption with the related key and read by the receiver (e.g. the video management system) which fetch the related key and use it for SRTP decryption.

Figure 9:
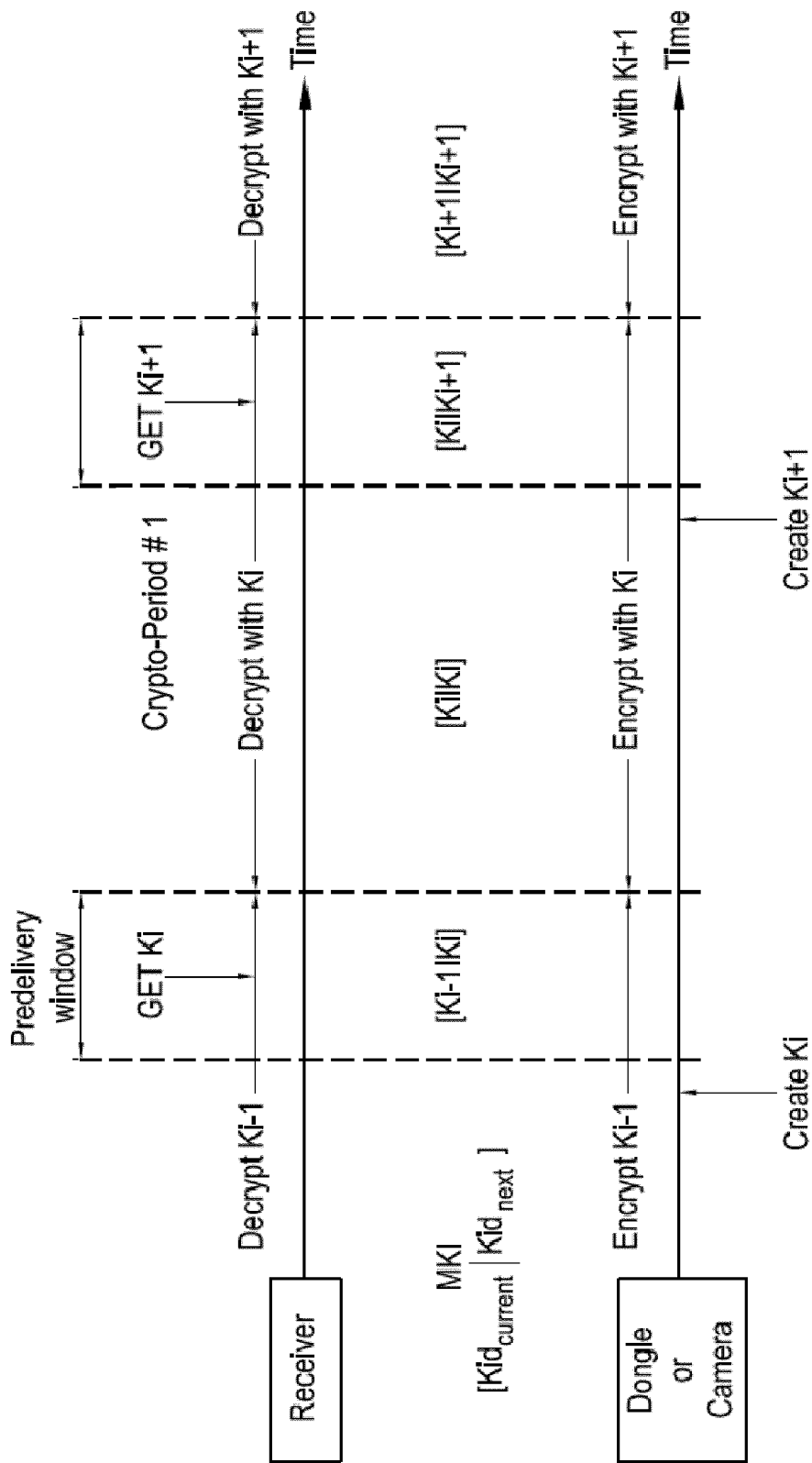
FIG. 9 illustrates SRTP key rotation signaling in accordance with example embodiments.

FIG. 9 illustrates the SRTP key rotation signaling in accordance with example embodiments. FIG. 9 focus on a generic crypto-period management over time as shown in FIG. 8. It shows the details related to a current crypto-period (i) showing also the end of the previous crypto-period (i−1) and the beginning of the next crypto-period (i+1): key creation (security apparatus) and fetching (video management system), SRTP MKI packet header format and period of usage of the key by both.

In a general embodiment, the method and system splits the video content from a camera into RTP packets and encrypts the payloads of the RTP packets to enable secure transmission. Headers of the RTP packets carry at least two copies of encryption keys for use in the decryption of the RTP packets when received after transmission to a video management system. Of the encryption keys, at least one is the current encryption key required for encryption in the current crypto period when key rotation is used. During a period just before the change of a crypto period, e.g. in a period that can be termed the pre-delivery window, the key for the next crypto period can be obtained and included as at least one of the keys in the header of the RTP packet. This provides the decryption process with the key in advance of the crypto period in which it is required and avoids decryption delays.

In one example, the encrypted RTP packets are SRTP packets and the in order to be compliant with the SRTP specification, only one key can be contained in the header of each packet. This can be met by providing a single key in the form of a combination of a plurality of keys. The keys can be combined to appear as a single key by simple concatenation or by any other combinatorial method.

In one example, the RTP header includes two keys, which are either two copies of the current key for the current crypto period, or, near the end of the crypto period, the RTP header in the packets is changed to include the current key and the key for the next crypto period.

The keys inserted in the headers of the RTP packets can be key identifiers used to identify the master key to be used for decryption. The key management protocol may exchange a single master key, and all session keys are generated by applying the key derivation function. In example embodiments, for SRTP protection, key rotation signaling is performed using an original master key index (MKI) for signaling two key identifiers (KID).

Figure 10:
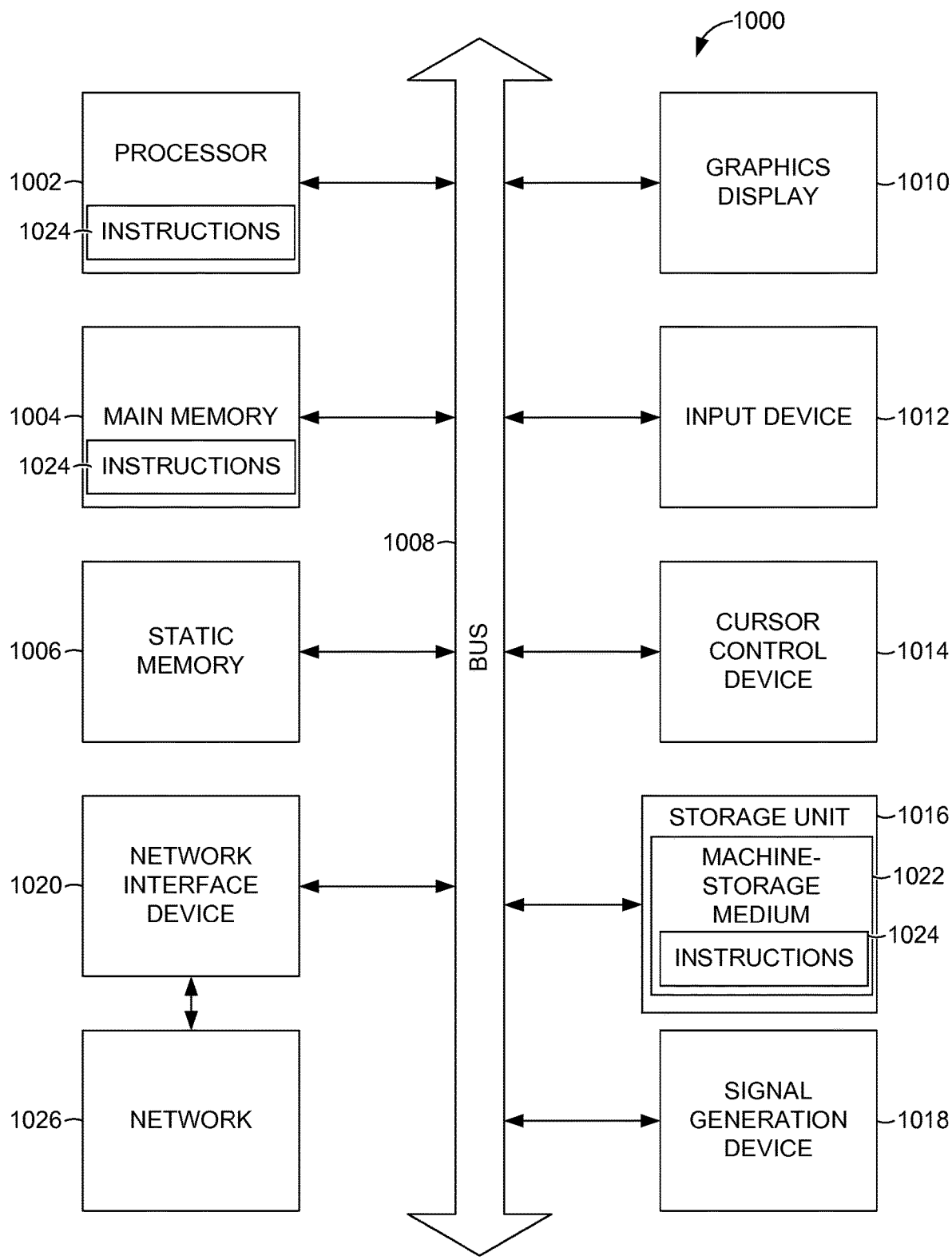
FIG. 10 is a diagrammatic representation of a machine in an example form of a computing system within which a set of instructions may be executed for causing the machine to perform any one or more of the methodologies discussed herein, according to an example embodiment.

FIG. 10 is a block diagram illustrating components of a machine 1000, according to some example embodiments, able to read instructions 1024 from a machine-storage medium 1022 (e.g., a non-transitory machine-storage medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer device (e.g., a computer) within which the instructions 1024 (e.g., software, a program, an application, an applet, an app, or other executable code) for causing the machine 1000 to perform any one or more of the methodologies discussed herein may be executed, in whole or in part. In example embodiments, the machine 1000 may be the edge security apparatus.

The instructions 1024 can transform the general, non-programmed machine 1000 into a particular machine (e.g., specially configured machine) programmed to carry out the described and illustrated functions in the manner described.

In alternative embodiments, the machine 1000 operates as a standalone device or may be connected (e.g., networked) to other machines. The machine 1000 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 1000 capable of executing the instructions 1024, sequentially or otherwise, that specify actions to be taken by that machine 1000. Further, while only a single machine 1000 is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes the machine-storage medium 1022 (e.g., a tangible machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered machine-storage media 1022 (e.g., tangible and non-transitory machine-storage media).

In some example embodiments, the machine 1000 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1022 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1022 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communications network 1026 using a transmission medium via the network interface device 1020 and utilizing any one of a number of well-known transfer protocols (e.g., HTTP). Examples of communication networks 1026 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 1022 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-pur pose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Examples

Example 1 is a method for securing a deployed camera. The method comprises accessing, by a security apparatus coupled to a camera, video content from the coupled camera; accessing, by a security apparatus coupled to a camera, video content from the coupled camera; splitting, by a security apparatus, the video content within a plurality of RTP packets; encrypting, by a security apparatus, payloads of the RTP packets; embedding, by a security apparatus, in a header of the encrypted RTP packets, at least two key identifications for decryption of the encrypted RTP packets; and transmitting, by a security apparatus, the plurality of RTP packets over a network to a video management system.

In example 2, including the subject matter of example 1, optionally the video content is packaged in a CMAF fragments.

In example 3, including the subject matter of examples 1-2, optionally the header of the encrypted RTP packets is conformed to the SRTP standard In example 4, including the subject matter of examples 1-3, optionally the encrypting the video content comprises at startup, requesting and obtaining a first key (K1, Kid1) from a key server and setting a master key K1 to SRTP protection management with MKI11=(Kid1∥Kid1).

In example 5, including the subject matter of examples 1-4, optionally the encrypting the video content further comprises at a start of crypto-period, requesting a next key; encrypting the RTP packets with (K1, MKI11); obtaining the next key (K2, Kid2); setting the master key K1 to SRTP next key (K2, Kid2); setting the master key K1 to SRTP protection management with MKI12=(Kid1∥Kid2); and setting a master key K2 to SRTP protection management with MKI22=(Kid2∥Kid2).

In example 6, including the subject matter of examples 1-5, optionally the encrypting the video content further comprises encrypting the RTP packets with (MKI12, K1) in response to entering pre-delivery windows.

In example 7, including the subject matter of examples 1-6, optionally the encrypting the video content further comprises in response to entering a next crypto-period, requesting a further key from the key server (K3); encrypting the RTP packets with (MKI22, K2); and receiving the further key (K3, Kid3).

In example 8, including the subject matter of examples 1-7, optionally the apparatus is coupled to the deployed camera by connecting the apparatus behind the camera.

In example 9, including the subject matter of examples 1-8, can optionally include, at the video management system, receiving, over the network, the CMAF fragments within the plurality of RTP packets; identifying the CMAF fragments in the RTP packets; and rendering video from the CMAF fragments.

Example 10 is a system to secure a deployed camera. The system includes one or more hardware processors and a storage device storing instructions, that when executed by the one or more hardware processors, cause the one or more hardware processors to carry out the method of any one of examples 1 to 9.

Example 11 is a machine-storage medium for securing a deployed camera. The machine-storage medium carries machine readable instructions, which when implemented by at least one processor of the machine, causes the machine to carry out the method of any one of examples 1 to 9.

Example 12 is a signal medium for securing a deployed camera. The signal medium carries machine readable instructions, which when implemented by at least one processor of the machine, causes the machine to carry out the method of any one of examples 1 to 9.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

The invention claimed is:

1. A method implemented by a security apparatus coupled to a previously deployed camera that lacks built-in security and smart features, the method comprising:
accessing video content from the previously deployed camera;
splitting the video content into a plurality of real-time transport protocol (RTP) packets;
encrypting payloads of the RTP packets using a key of a current crypto-period to generate encrypted RTP packets;
embedding in a header of at least some of the encrypted RTP packets, at least two key identifications for decryption of the encrypted RTP packets during a period of the current crypto-period before the current crypto-period is changed to a next crypto-period, the at least two key identifications including an identification of the key used for the current crypto-period and an identification of a key to be used in the next crypto-period; and
transmitting the plurality of encrypted RTP packets over a network to a video management system.

2. The method of claim 1, wherein the video content is packaged in a Common Media Application Format (CMAF) fragments.

3. The method of claim 1, wherein the header of the encrypted RTP packets is conformed to a secure real-time protocol (SRTP) standard.

4. The method of claim 3, wherein the encrypting the video content comprises, at startup, requesting and obtaining a first key (K1, Kid1) from a key server and setting a master key K1 to SRTP protection management with master key index (MKI)11=(Kid1||Kid1).

5. The method of claim 4, wherein the encrypting the video content further comprises, at a start of the current crypto-period:
requesting a next key;
encrypting the RTP packets with (MKI11, K1);
obtaining the next key (K2, Kid2);
setting the master key K1 to SRTP protection management with MKI12=(Kid1||Kid2); and
setting a master key K2 to SRTP protection management with MKI22=(Kid2||Kid2).

6. The method of claim 5, wherein the encrypting the video content further comprises encrypting the RTP packets with (MKI12, K1) in response to entering pre-delivery windows.

7. The method of claim 6, wherein the encrypting the video content further comprises, in response to entering the next crypto-period:
requesting a further key from the key server (K3);
encrypting the RTP packets with (MKI22, K2); and
receiving the further key (K3, Kid3).

8. The method of claim 1, wherein the security apparatus is coupled to the previously deployed camera using bump-in-the-wire deployment.

9. The method of claim 1, further comprising, at the video management system:
receiving, over the network, the plurality of encrypted RTP packets;
decrypting the plurality of encrypted RTP packets;
identifying CMAF fragments in the RTP packets; and
rendering video from the CMAF fragments.

10. A system comprising:
one or more hardware processors; and
a storage device storing instructions, that when executed by the one or more hardware processors, cause the one or more hardware processors to perform operations comprising:
accessing, by a security apparatus coupled to a previous deployed camera that lacks built-in security and smart features, video content from the previously deployed camera;
splitting, by the security apparatus, the video content into a plurality of real-time transport protocol (RTP) packets;
encrypting, by the security apparatus, payloads of the RTP packets using a key of a current crypto-period to generate encrypted RTP packets;

embedding, by the security apparatus, in a header of at least some of the encrypted RTP packets, at least two key identifications for decryption of the encrypted RTP packets during a period of the current crypto-period before the current crypto-period is changed to a next crypto-period, the at least two key identifications including an identification of the key used for the current crypto-period and an identification of a key to be used in the next crypto-period; and transmitting, by the security apparatus, the plurality of encrypted RTP packets over a network to a video management system.

11. The system of claim 10, wherein the video content is packaged in a Common Media Application Format (CMAF) fragments.

12. The system of claim 10, wherein the header of the encrypted RTP packets is conformed to a secure real-time protocol (SRTP) standard.

13. The system of claim 12, wherein the encrypting the video content comprises, at startup, requesting and obtaining a first key (K1, Kid1) from a key server and setting a master key K1 to SRTP protection management with master key index (MKI)11=(Kid1||Kid1).

14. The system of claim 13, wherein the encrypting the video content further comprises, at a start of the current crypto-period:
 requesting a next key;
 encrypting the RTP packets with (MKI11, K1);
 obtaining the next key (K2, Kid2);
 setting the master key K1 to SRTP protection management with MKI12=(Kid1||Kid2); and
 setting a master key K2 to SRTP protection management with MKI22=(Kid2||Kid2).

15. The system of claim 14, wherein the encrypting the video content further comprises encrypting the RTP packets with (MKI12, K1) in response to entering pre-delivery windows.

16. The system of claim 15, wherein the encrypting the video content further comprises in response to entering the next crypto-period,
 requesting a further key from the key server (K3);
 encrypting the RTP packets with (MKI22, K2); and
 receiving the further key (K3, Kid3).

17. The system of claim 10, wherein the security apparatus comprises a dongle that is configured to encrypt and pack the video content for transmission.

18. The system of claim 10, wherein the operations further comprise, at the video management system:
 receiving, over the network, the plurality of encrypted RTP packets;
 decrypting the plurality of encrypted RTP packets;
 identifying CMAF fragments in the RTP packets; and
 rendering video from the CMAF fragments.

19. A machine-storage medium storing instructions, which when implemented by one or more hardware processors of a machine, causes the machine to perform operations comprising:
 accessing, by a security apparatus coupled to a previously deployed camera that lacks built-in security and smart features, video content from the previously deployed camera;
 splitting, by the security apparatus, the video content into a plurality of real-time transport protocol (RTP) packets;
 encrypting, by the security apparatus, payloads of the RTP packets using a key of a current crypto-period to generate encrypted RTP packets;
 embedding, by the security apparatus, in a header of at least some of the encrypted RTP packets, at least two key identifications for decryption of the encrypted RTP packets during a period of the current crypto-period before the current crypto-period is changed to a next crypto-period, the at least two key identifications including an identification of the key used for the current crypto-period and an identification of a key to be used in the next crypto-period; and
 transmitting, by the security apparatus, the plurality of encrypted RTP packets over a network to a video management system.

* * * * *